Patented Aug. 8, 1933

1,921,505

UNITED STATES PATENT OFFICE 1,921,505

LOW APPARENT DENSITY SODIUM CARBONATE

Heinz H. Chesny, Los Angeles, Calif.

No Drawing. Application January 21, 1929
Serial No. 333,984

2 Claims. (Cl. 23—63)

This invention relates to a new product consisting of a form of anhydrous sodium carbonate, the soda ash of commerce, which is characterized by having a low density, i. e., weight per cubic foot.

The ordinary soda ash of commerce has an apparent density of between 0.7 and 0.9. It is produced by decomposing sodium bicarbonate by the action of heat. The relatively dense product thus obtained consists of round or elongated particles of various sizes. Due to the size and shape of these particles, the material packs relatively closely and a dense mass is obtained. The disadvantage of this soda ash resides in the fact that it has a relatively low rate of solution.

It is the primary object of the present invention to provide a soda ash with a low apparent density, for example, between .38 and .52, and therefore to provide a product which possesses a high rate of solution.

I have found that by employing a special crystal form of sodium bicarbonate as the source of material to be carbonated into soda ash, I can produce a soda ash of the desired density. The special form of sodium bicarbonate consists of sodium bicarbonate crystals, the major part of which consist of stellatic clusters and are crystals of relatively large size. These stellatic clusters of crystals of sodium bicarbonate, I have found, can be produced in accordance with the specifications of my copending application entitled "Process of forming sodium bicarbonate" filed January 21, 1929, Serial No. 333,986, in which solutions of sodium carbonate usually containing salt at a concentration of about 100 to 200 grams per liter, is carbonated between the temperature limits of 46° and 76° C. and under a partial pressure of carbon dioxide sufficient to suppress formation of sesqui-carbonate.

When these conditions are met, the greater part of the sodium bicarbonate precipitated is in the form of these stellatic clusters. It is also possible to take the normal soda ash and dissolve the same in water, forming an alkaline solution from which stellatic crystals of sodium bicarbonate may be precipitated by carbonating the solution between the temperature limits of 46° and 76° C. and under the conditions heretofore described.

The stellatic clusters of crystals of sodium bicarbonate are calcined in any usual or customary apparatus, to form soda ash. For example, the usual operation consists of calcining the same in a rotary calciner. The reaction which takes place results in the decomposition of the sodium bicarbonate into sodium carbonate, while maintaining the original stellatic form of the sodium bicarbonate crystals.

As a result, the soda ash produced is light and fluffy in nature, possessing an apparent density of between 0.38 and 0.52. The product thus produced has an exceptionally high rate of solution.

While the particular process of producing the product herein described is well adapted for the purpose, it is understood that the invention is not limited to the process, but the invention includes generally the subject matter defined in the appended claims.

I claim:

1. As a new article of manufacture, sodium carbonate having an apparent density of between 0.38 and 0.52.

2. As a new article of manufacture consisting of sodium carbonate characterized by having a majority of its particles in the form of stellatic clusters and having an apparent specific gravity of between 0.38 and 0.52.

HEINZ H. CHESNY.